United States Patent [19]
Aubert et al.

[11] 4,167,445
[45] Sep. 11, 1979

[54] NUCLEAR REACTOR

[75] Inventors: Michel Aubert, Pierrevert; Paul Lambert, Echirolles, both of France

[73] Assignee: Commissariat a l'Energie Atomique, Paris, France

[21] Appl. No.: 877,478

[22] Filed: Feb. 13, 1978

Related U.S. Application Data

[63] Continuation of Ser. No. 743,412, Nov. 19, 1976, abandoned.

[30] Foreign Application Priority Data

Nov. 26, 1975 [FR] France .............................. 75 36226

[51] Int. Cl.² ............................................. G21C 15/00
[52] U.S. Cl. ...................................... 176/65; 176/40; 176/87
[58] Field of Search ....................... 176/40, 65, 87, 38, 176/61

[56] References Cited

U.S. PATENT DOCUMENTS

| 2,852,456 | 9/1958 | Wade | 176/87 |
| 3,401,081 | 9/1968 | Menzel et al. | 176/61 |
| 3,962,032 | 6/1976 | Berniolles | 176/40 |
| 4,032,399 | 6/1977 | Defauchy et al. | 176/65 |

FOREIGN PATENT DOCUMENTS 2248583  5/1975  France ......................................... 176/65

Primary Examiner—Harvey E. Behrend
Attorney, Agent, or Firm—Lane, Aitken & Ziems

[57] ABSTRACT

A first annular space is formed between a cylindrical baffle and the reactor vessel and a second annular space is formed between the baffle and a counter-baffle. The level of liquid metal coolant is free within the two annular spaces which are separated by the baffle. The top edge of the baffle has a profile such that they supply of "cold" liquid metal which overflows into the discharge space takes place without breaking away from the baffle wall.

13 Claims, 8 Drawing Figures

NUCLEAR REACTOR

This is a continuation of application Ser. No. 743,412 filed Nov. 19, 1976, now abandoned.

This invention relates to a nuclear reactor of the type which is cooled by a liquid metal and especially by liquid sodium.

In more precise terms, the present invention relates to a system for cooling the main vessel and/or the primary vessel of an integrated fast reactor which is cooled with liquid sodium.

By integrated reactor is meant a nuclear reactor in which the primary coolant circuit is placed entirely within the main reactor vessel or in other words in which the heat-exchangers as well as the pumps for the circulation of the primary fluid are placed entirely within the main reactor vessel.

The problem which the present invention makes it possible to solve will be more readily understood by referring to FIG. 1 of the accompanying drawings in which the main vessel of a liquid sodium cooled integrated reactor of known type is illustrated diagrammatically in vertical cross-section.

There is shown in this figure the concrete pressure vessel 2 of the reactor, said vessel being closed by the reactor vault roof 4 which is fitted with a number of rotating shield plugs such as those designated by the reference numerals 6 and 8. The reactor vessel proper is constituted by the wall 10 of the main vessel, the primary sodium being placed within said vessel. The main vessel 10 is suspended directly from the concrete vault roof 4. The reactor core 12 is constituted by fuel assemblies which are inserted at the lower ends thereof into the reactor core diagrid 14. Said diagrid rests on a support plate 16 which is in turn supported by the main vessel 10. Provision is made within the interior of the vessel for a certain number of primary pumps such as 18 and heat-exchangers such as 20. The zones in which the so-called "hot" sodium 21 and the so-called "cold" sodium 22 are present are separated by the primary vessel 23 which comprises a lower cylindrical shell 25 and an upper cylindrical shell 34 which are joined together by means of a skew wall 24. The hot sodium is located within the interior of the primary vessel 23 whilst the cold sodium is present within the space 22 which is usually designated as the intervessel space and formed between the main vessel 10 and the primary vessel 23.

The sodium flows upwards through the fuel assemblies of the reactor core 12, is transferred into the primary vessel in the hot state, penetrates into the heat-exchanger 20 in which it is cooled, then passes out at 26 and flows into the intervessel space 22. This cold sodium is sucked-in by the pump 18 and discharged at low pressure into the diagrid 14 through the duct 28, whereupon the cycle is resumed.

The primary sodium contained in the main vessel 10 is surmounted by a blanket 30 of argon under pressure.

The main vessel 10 which supports the installations as a whole is subjected to very substantial thermal gradients. In fact, the sodium is at a temperature of the order of 380° C. at the reactor core inlet (cold sodium) and at a temperature of the order of 540° C. at the reactor core outlet (hot sodium). In order to cool the main vessel 10, a fraction of the cold sodium stream is employed. The cold sodium is maintained in contact with the main vessel walls by making provision for two concentric baffle-walls 32 and 34 which form the passages 36 and 38. The passage 36 has its opening beneath the diagrid support plate 16 and is supplied with a small portion of the cold sodium stream which is injected into the diagrid 14 at the lower end of the fuel assemblies. The cold sodium returns downwards through the passage 38 into the intervessel space 22.

This cooling system proves sufficient for fast reactors of medium power but distinctly insufficient for high-power reactors (for example reactors having an electrical power output of 1000 MW). In fact, when changes occur in the operating regime of the reactor, the level of the hot sodium varies. The same therefore applies to the level of cold sodium at the upper portion of the passages 36 and 38. The connection between the passages 36 and 38 is not closed at the upper end and simply limited by the argon layer 30 which covers the entire free surface of the sodium. In the event of an increase in level of hot sodium, the level of cold sodium between the main vessel 10 and the cylindrical shell 34 rises. An uncirculated sodium layer of considerable depth is therefore present in the upper portion of the passage 36. This substantial and unrenewed layer is heated by the thermal radiation emitted by the hot sodium. In consequence, the main vessel is no longer cooled by this means in the zone in which it is in contact with this motionless layer of sodium. In fact, this zone corresponds precisely to the upper portion of the main vessel in which the stress applied to the vessel is of maximum value. On the contrary, in the event of reduction in the level of cold sodium, an overflow process takes place as the cold sodium passes above the cylindrical shell 32. At the time of this overflow, argon bubbles are liable to be introduced into the sodium which passes through the passage 38. The danger here, of course, is that this may give rise to a highly objectionable effect since the resultant cooling action on the reactor fuel assemblies is liable to be both insufficient and irregular.

One known solution consists in making provision for a siphon at the upper portion of the annular spaces 36 and 38, thereby resulting in circulation of the cold sodium within this zone of the main vessel. While being very effective, this solution nevertheless complicates the internal structure of the vessel and increases the weight of this latter to a marked degree as well as entailing the need to adjust the gas pressure within the chamber of the siphon.

The present invention is precisely directed to a simplified reactor vessel structure which makes use of the phenomenon of overflow of the cold sodium within the main-vessel zone mentioned above but which, surprisingly, prevents breakaway of the overflowing sheet of sodium, thereby in turn preventing the entrainment of the gas bubbles which constitute the gas blanket of the vessel. This cooling means can be contemplated for cooling the wall of the main vessel or of a primary vessel of the suspended type as will be explained hereinafter.

The nuclear reactor in accordance with the invention is of the type comprising a vessel placed within an enclosure which is closed at the top by means of a reactor vault roof from which said vessel is suspended, said vessel being intended to contain the reactor core and partially filled with liquid sodium which serves to cool said core, a blanket of inert gas being placed above the free surface of said liquid, said reactor being further provided with means for collecting said "hot" liquid metal after it has passed through the reactor core and re-injecting said "cold" liquid metal into the lower portion of said reactor vessel beneath said core, said vessel being further provided with a first cylindrical shell or baffle which forms a first annular space between said baffle and the reactor vessel and a second cylindrical shell or counter-baffle which forms a second annular space between said counter-baffle and the first cylindrical shell, one of the two annular spaces aforesaid being employed for supplying "cold" liquid metal and the other annular space being employed for discharging said liquid metal.

The nuclear reactor is distinguished by the fact that the level of liquid metal is free within both annular spaces and that said first cylindrical shell which forms a separation between the two annular spaces has a free top edge located above the maximum level of said "cold" liquid metal within said annular discharge space and that the edge aforesaid has a profile such that the flow over said edge of "cold" liquid metal derived from the annular supply space takes place without any breakaway of the overflowing sheet of said liquid metal along the wall of said cylindrical shell which forms a separation between the two annular spaces.

In accordance with a first embodiment, the cooling system is concerned with the main vessel.

The reactor is accordingly distinguished by the fact that the annular supply space is delimited by the first cylindrical shell and by the internal wall of said main vessel, said vessel being intended to contain the total volume of liquid metal together with the inert blanket gas which is present above said liquid metal and the top of the vessel being closed by a vault roof from which said vessel is suspended, and by the fact that the annular discharge space is delimited by said first cylindrical shell and by said second cylindrical shell, said annular discharge space being intended to open at the lower end thereof into the lower portion of said main vessel.

In accordance with another distinguishing feature of this embodiment, the annular discharge space is closed-off at the lower end thereof and communicates with the lower portion of the main vessel only by means of calibrated orifices formed in said second cylindrical shell.

In accordance with a second embodiment, the cooling system is concerned with the inner or primary vessel which is of the suspended and supporting type.

The reactor is accordingly distinguished by the fact that said primary vessel comprises said first and second cylindrical shells and that said first shell has a free top edge, the bottom edge of said shell being joined to said primary vessel in leak-tight manner, said vessel being provided with openings above the level of junction with said first cylindrical shell, the annular space between said primary vessel and the first cylindrical shell being such as to constitute the annular discharge space and the annular space between on the one hand the second cylindrical shell and on the other hand the primary vessel then the first cylindrical shell being such as to constitute the annular supply space.

In accordance with both embodiments, the shape of the edge aforesaid in vertical cross-section is that of a portion of circle joined tangentially to that wall of the first cylindrical shell which is directed towards the annular discharge space.

Preferably, said portion of circle has a diameter which is greater than the thickness of the first cylindrical shell.

In accordance with a different shape of edge, the portion of circle has a diameter which is equal to the thickness of the first cylindrical shell.

In all cases, the edge aforesaid can be provided with a plurality of vertical recesses which are uniformly spaced along the periphery of the edge.

A more complete understanding of the invention will in any case be obtained from the following description of a number of embodiments which are given by way of example without any limitation being implied, reference being made to the accompanying drawings, wherein:

FIG. 1 as described earlier is a vertical sectional view of the vessel of a liquid sodium cooled nuclear reactor in accordance with the prior art;

FIG. 2 is a partial vertical sectional view of a nuclear reactor vessel showing a first embodiment of the cooling system adopted for the main vessel;

FIGS. 3 and 3' are two partial views showing the shape of the edge of the baffle;

Figure 1:
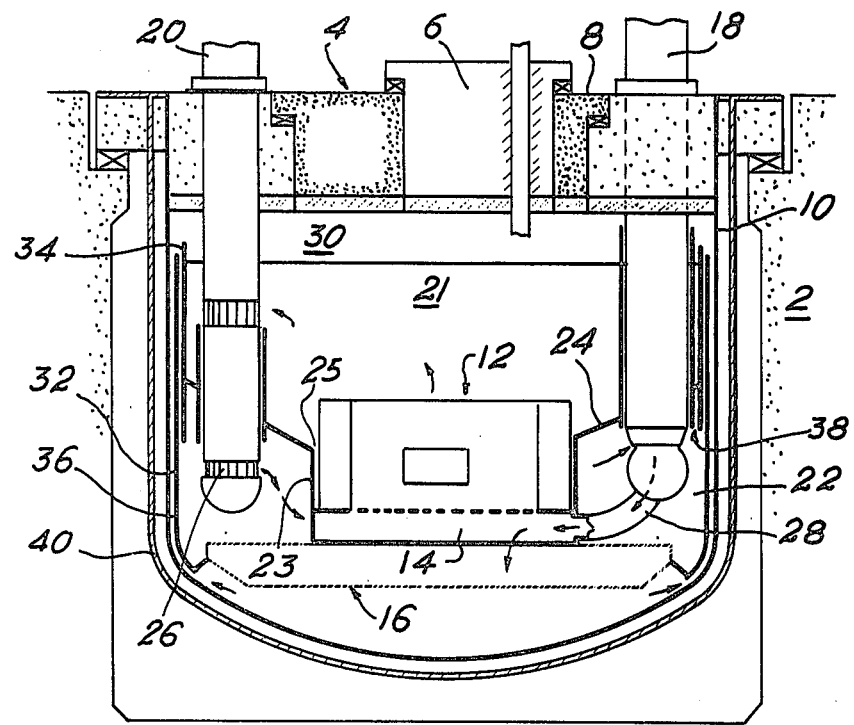

In FIG. 2, there are again shown certain elements of FIG. 1 which will not of course be described further; it will be considered sufficient to describe in detail the distinctive features of the invention which form the subject of this patent.

Provision is made within the interior of the vessel 10 for a cylindrical shell 50 or baffle which has the same axis as the vessel 10, an annular space 52 being formed between said cylindrical shell 50 and said vessel. The baffle 50 is joined at the lower end to the diagrid support plate 16, with the result that part of the cold sodium which is re-injected by the pumps 18 is thus permitted to circulate within the annular space 52. The baffle 50 is provided with a free edge 54 at the upper end.

The vessel 10 also has a second cylindrical shell 56 which is concentric with the first and which will hereinafter be designated as a counter-baffle.

A second annular space 58 is formed between the counter-baffle 56 and the baffle 50. The counter-baffle has its opening at the lower end beneath the skew wall 24 which limits the cold sodium zone. At the upper end 60, the counter-baffle 56 is also free and located above the free level A of the hot sodium.

The edge 54 is located at a height such that said edge is always above the free level D of the cold sodium within the annular space 58 at any operating regime of the reactor. The free level B of the cold sodium within the space 52 is clearly located slightly above the edge 54 and said level B is substantially constant irrespective of variations in flow rate of the primary sodium.

The cold sodium flows over the top edge 54 so as to form an overflowing sheet as represented diagrammatically by the arrow C and penetrates into the second annular space 58.

When the pumps are in operation, which corresponds to a range of flow rates from the nominal flow rate Qn to a flow rate of 0.2 Qn, the level A is higher than the level D as can be seen in the figure. When the pumps are stopped, which corresponds to a flow rate of 0.1 Qn, equality of the two levels is achieved at that time as accordingly indicated in the figure at A' and at D'.

In accordance with the invention, the edge 54 of the baffle 50 is given a profile such that the overflowing sheet C does not break-away from the internal wall 62 of the baffle 50. Thus the overflowing sheet C practically does not entrain any bubbles of the gas (such as argon, for example) which constitutes the top blanket.

Studies carried out have shown that it was possible to obtain this effect by giving the edge 54 the shape of a portion of circle in vertical cross-section.

Figure 3:
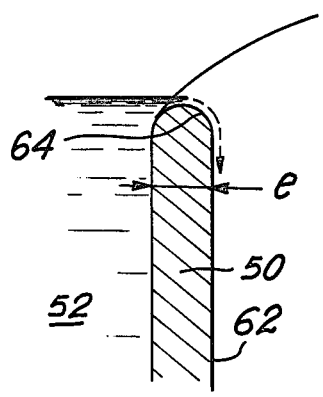
Figure 3:
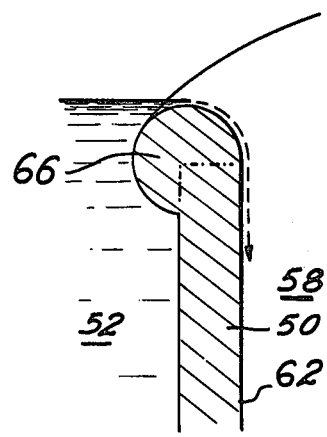

Particularly well adapted shapes of the top edge are shown in FIGS. 3 and 3'.

In FIG. 3, the edge has the shape of a semicircle 64, the diameter of which is equal to the thickness e of the sheet metal element which constitutes the baffle 50. It is observed in particular that said semicircle is joined tangentially to the internal wall 62 of the baffle 50.

FIG. 3' shows another example of construction in which the edge is constituted by a portion of torus 66 having a vertical cross-section in the shape of a portion of circle. This portion of circle is joined tangentially to the internal wall 62 of the baffle 50. As will be shown later, these circular edges make it possible to obtain an overflowing sheet without breakaway in respect of very variable rates of flow of sodium within the annular space 52, this design being particularly advantageous when the nominal flow rate of the sodium attains a fairly high value.

It should be mentioned that the counter-baffle 56 which serves to direct the cold sodium towards the lower zone of the reactor vessel (beneath the skew wall 24) in which the cold sodium is located also performs the following function: it enables the small quantity of bubbles which are present in the overflowing sodium to pass upwards through the annular space 58 to the free surface at which they are released into the blanket gas 30.

By way of example, in the case of a nominal flow rate Qn of sodium within the annular space 52 of 600 liters/second, the internal diameter of the main vessel 10 being approximately 21 m and the diameter of the rounded edge being 50 mm, the tolerance in surface planarity being ±2.5 mm, the following results were obtained: flow rate of gas entrained with respect to flow rate of sodium:
lower than $5 \times 10^{-5}$ in volume in respect of a gap of 150 mm between baffle and counter-baffle;
lower than $10^{-4}$ in volume in respect of a gap of 75 mm between baffle and counter-baffle.

Furthermore, in the case of variations in flow rate ranging from Qn to 0.1×Qn, the free surface B of the sodium along the vessel 10 has varied only by 18 mm, taking into account the temperature regimes corresponding to the different flow rates.

Figure 4:
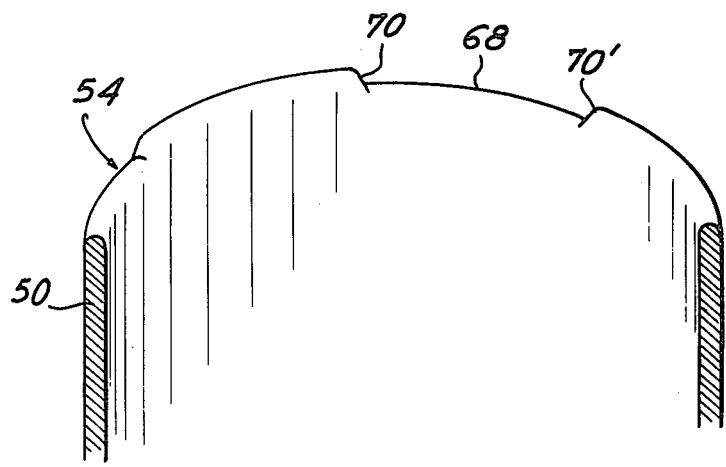
FIG. 4 is a view of the edge of the baffle provided with recessed portions.

In the event that the flow rates have fairly low values, it may prove advantageous to provide the edge 54 of the baffle 50 with recessed portions as shown in FIG. 4. The recessed portions such as the portion 68 are uniformly spaced over the entire length of the edge. The sloping sides 70 and 70' as well as the sill 72 of each recessed portion are of course also given a rounded profile.

In this case, the length of the recessed portions along the periphery of the edge 54 with respect to the length of the edge 54 is determined as a function of the minimum flow rate to be ensured.

Figure 5:
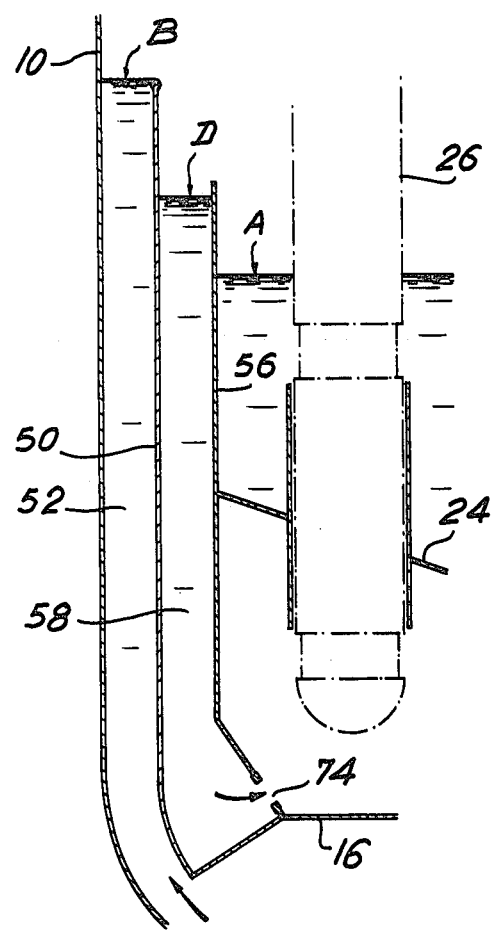
FIG. 5 is a diagram showing a particular mode of adjustment of the level of the overflowing sheet for cooling the main vessel.

One mode of adjustment of the free levels of sodium D and A is shown in FIG. 5.

From this figure, it is apparent that the level D is adjusted to a height which is greater than that of the level A. The counter-baffle 54 is accordingly extended to the diagrid support plate 16 and a communication between the annular space 58 and the remainder of the vessel is established by means of calibrated orifices such as those designated by the reference numeral 74. These calibrated orifices create a pressure drop which serves to "raise" the level D.

This makes it possible to reduce the difference in height between the levels B and D. In this embodiment, the level D is always higher than the level A within values of flow rates ranging from the nominal flow rate Qn to a flow rate of 0.2 Qn when the pumps are in operation. When the pumps are stopped (which corresponds to a flow rate of 0.1 Qn) equality of the levels D and A is achieved at this time.

Figure 6:
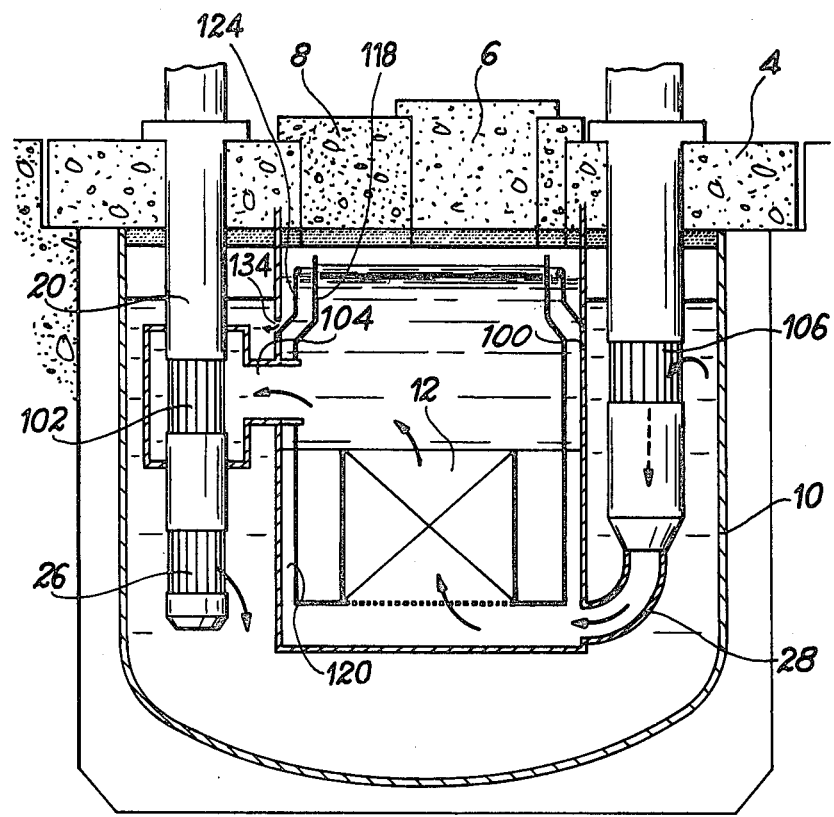
FIG. 6 is a vertical sectional view of a reactor having a suspended primary vessel equipped with the cooling system in accordance with the invention.
Figure 7:
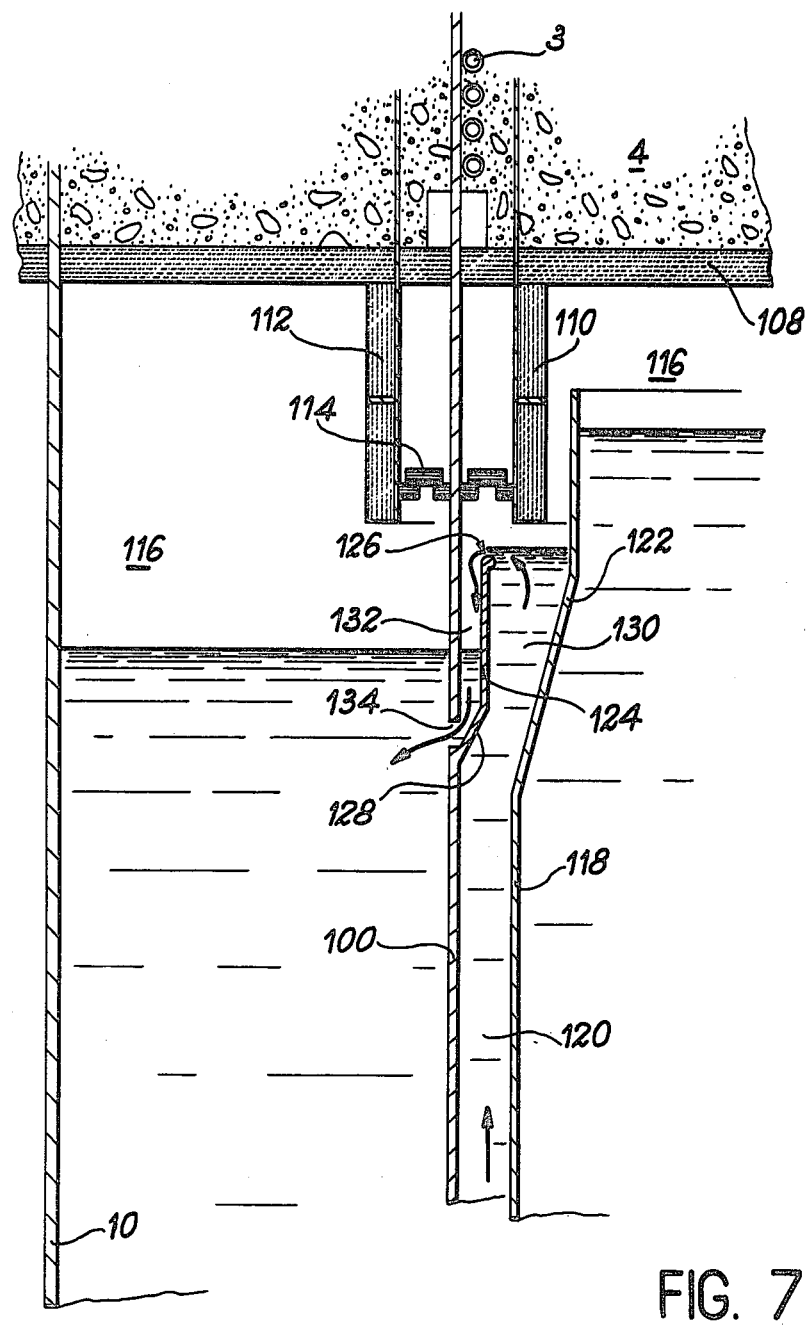
FIG. 7 is a detail view of FIG. 6 showing the cooling system.

In FIGS. 6 and 7, there is shown the adaptation of the cooling system in accordance with the invention to the case of cooling of the inner vessel or primary vessel of a liquid sodium cooled nuclear reactor in which the primary vessel is suspended from the reactor vault roof. There are again shown of course the main vessel 10 which is suspended from the concrete vault roof 4, the entire structural assembly being thus designed to form a pressure-tight enclosure. The vault roof 4 is fitted with two eccentric rotating shield plugs 6 and 8 in accordance with well-known practice. In this form of construction, provision is made in the interior of the main vessel 10 for the inner or primary vessel 100 which is also suspended at the top end from the reactor vault roof 4. The supporting structure formed by the vessel 100 is designed in particular to support the reactor core 12 and contains the hot liquid sodium above which is present a blanket gas such as argon, for example. Provision is also made within the interior of the main vessel for primary pumps such as those designated by the reference 18 and primary heat-exchangers such as those designated by the reference 20. The space formed between the main vessel 10 and the inner vessel 100 contains "cold" sodium. The "hot" sodium which is discharged from the primary vessel 100 flows towards the inlet 102 of each heat exchanger 20 via nozzle ducts such as the duct 104. At the outlet 26 of each heat exchanger 20, the cold sodium is re-injected between the two vessels. It then passes into the pumps such as the pump 18 via the inlet 106 and is discharged from this latter through ducts such as 28 which reinject the cold sodium directly into the bottom portion of the reactor core 12. The reactor vault roof 4 is provided with a bottom lining 108 on that face which is directed towards the interior of the vessel. On each side of the top anchoring end-portion of the vessel 100, heat-insulating structures 110 and 112 associated with baffles 114 and having anti-radiation and anti-convection effects form a thermal shield system for protecting the top wall of the vessel 100 which is surrounded by the top blanket gas 116. In order to reconstitute the systeem described in the main patent Application, the vessel 100 is provided with an inner cylindrical shell 118 which defines an annular passage 120 with the vessel 100, said annular passage being supplied at the lower end by the leakage flow of the "cold" sodium which is injected into the lower portion of the reactor core 12. At the upper end, the cylindrical shell 118 has a portion 122 of smaller diameter which increases the width of the annular space 120 in this region. In the upper region in which the annular space 120 has the greatest width, provision is made for a cylindrical shell 124, the top edge or sill 126 of which is free and the bottom edge of which is joined to the inner vessel 100 by means of a frusto-conical shell 128. In this manner, the cylindrical shell 124 divides the upper portion of the annular space 120 into two regions: a region 130 which forms an extension of the annular space 120 and a region 132 which is defined by the cylindrical shell 124 and the vessel 100. Above the frust-conical shell 128, the vessel 100 is provided with a plurality of openings such as the opening 134. If a comparison is made with the description of the main patent Application, it becomes apparent that the shell 118 performs exactly the same function as the shell 50 of the foregoing paragraphs and that the upper portion of the inner vessel 100 performs the function of counterbaffle in the same manner as the shell 56 of the main patent Application.

The "cold" sodium is supplied through the annular space 120 and then passes over the overflow sill 126. This liquid sodium coolant is then discharged through the openings 134, the diameter of which can be calibrated in order to adjust the relative level within the annular space 132.

It is readily apparent that the shape to be given to the sill 126 is the one shown in FIGS. 3 and 3' or in other words must be rounded and identical with those described earlier. Furthermore, the sill 126 can be provided with uniformly spaced recessed portions 68 (as shown in FIG. 4) which are identical with those described in the previous paragraphs. This structure clearly performs exactly the same function as that described in the foregoing. This makes it possible to stabilize the overflow level and to prevent entrainment of inert gas in the cooling circuit.

Figure 2:
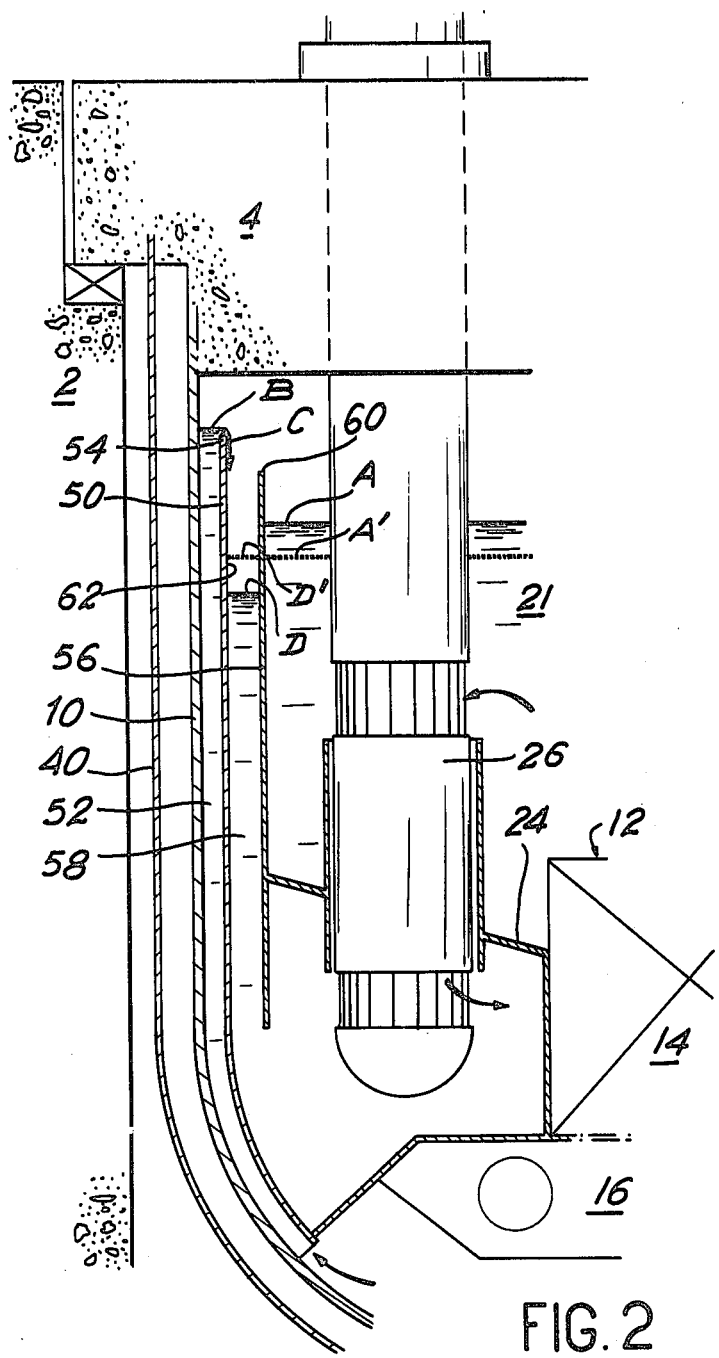

Only the following observations need be made in regard to the design solution described with reference to FIG. 2.

Since the overflow perimeter or in other words the perimeter of the sill 126 is much shorter, it is necessary to increase the radius of the sill or to reduce the coolant flow rate. On the other hand, the static pressure is applied from the interior of the cylindrical shells, thereby reducing the potential danger of buckling of said shells and especially of the shell 118.

It should be clearly understood first the invention is not limited to the example of construction which has been more especially described with reference to the accompanying drawings but extends on the contrary to all alternative forms. Thus it follows in particular that, depending on the conditions of use, the second cylindrical shell 118 can be designed with a geometry which is different from that described in the foregoing. For example, said second shell can be cylindrical up to the full height or else it can have a profile which makes the shell parallel first to the wall of the vessel 100 then to the firsrt cylindrical shell 128 in order to obtain an annular space 120 of constant section up to the full height of this latter.

What we claim is:

1. A nuclear reactor comprising a vessel placed within an enclosure, a reactor vault roof for closing the top of the enclosure, said vessel being suspended from the roof, a reactor core in said vessel, the vessel being partially filled with liquid metal for cooling said core, a blanket of inert gas being located above the free surface of said liquid, means for dividing the vessel into two compartments, one for hot liquid metal and one for cold liquid metal, the reactor being further provided with means for collecting and cooling said hot liquid metal after it has passed through the reactor core and reinjecting the resultant cold liquid metal into the lower portion of said reactor vessel beneath said core, said vessel being further provided with a first cylindrical shell which forms a first annular space between said first shell and the reactor vessel, a second cylindrical shell which forms a second annular space between said second shell and the first cylindrical shell, cold liquid metal being introduced in the bottom of one of the two annular spaces and the other annular space receiving liquid metal discharging from the top of said one annular space, wherein the level of liquid metal is free within both annular spaces and wherein said first cylindrical shell which forms a separation between the two annular spaces has a top edge located above the maximum level of the liquid metal within said other annular space, the edge having a profile such that the flow of liquid metal over said edge takes place by maintaining the overflowing sheet of said liquid metal in contact along the wall of said first cylindrical shell, means for maintaining the free level of the liquid in said one of the two annular spaces above the free top edge of the first shell, and means for maintaining the free level of the liquid in said other annular space under the free top edge of the first shell.

2. A nuclear reactor according to claim 1, wherein said one annular space is delimited by the first cylindrical shell and by the internal wall of the vessel, said vessel containing the liquid metal and the inert gas above said liquid metal, the top of the vessel being closed by said roof from which said vessel is suspended, and wherein said other annular space is delimited by said first cylindrical shell and by said second cylindrical shell, said other annular space opening at the lower end thereof into the lowr portion of said vessel.

3. A nuclear reactor according to claim 1, comprising a primary vessel placed within a main vessel, said vessel being said primary vessel which is suspended from the reactor vault roof, said primary vessel comprising said first cylindrical shell and said second cylindrical shell, wherein said first cylindrical shell has a free top edge and a bottom edge which is jointed to said primary vessel in leak-tight manner, said vessel being provided with openings above the level of junction with said first cylindrical shell, the annular space between said primary vessel and the first cylindrical shell constituting said other annular space, and the annular space between the second cylindrical shell and the primary vessel then the first cylindrical shell constituting said one annular space.

4. A reactor according to claim 2, wherein the shape of said edge in vertical cross-section is that of a portion of circle joined tangentially to that wall of the first cylindrical shell which is directed towards said other annular space.

5. A reactor according to claim 3, wherein the shape of said edge in vertical cross-section is that of a portion of circle joined tangentially to that wall of the first cylindrical shell which is directed towards said other annular space.

6. A reactor according to claim 3, wherein said edge is provided with a plurality of vertical recesses which are uniformly spaced along the periphery of the edge.

7. A nuclear reactor according to claim 2, wherein the annular discharge space is closed-off at the lower end thereof and communicates with the lower portion of the main vessel only by means of calibrated orifices formed in said second cylindrical shell.

8. A reactor according to claim 4, wherein said portion of circle has a diameter which is greater than the thickness of the first cylindrical shell.

9. A reactor according to claim 4, wherein said portion of circle has a diameter which is equal to the thickness of the first cylindrical shell.

10. A reactor according to claim 2, wherein said edge is provided with a plurality of vertical recesses which are uniformly spaced along the periphery of the edge.

11. A nuclear reactor comprising a vessel placed with an enclosure, a reactor vault roof for closing the top of the enclosure, said vessel being suspended from the roof, a reactor core in said vessel, the vessel being partially filled with liquid metal for cooling said core, a blanket of inert gas being located above the free surface of said liquid, means for dividing the vessel into two compartments, one for hot liquid metal and one for cold liquid metal, the reactor being further provided with means for collecting and cooling said hot liquid metal after it has passed through the reactor core and re-injecting the resultant cold liquid metal into the lower portion of said reactor vessel beneath said core, said vessel being further provided with a first cylindrical shell which forms a first annular space between said first shell and the reactor vessel, a second cylindrical shell which forms a second annular space between said second shell and the first cylindrical shell, cold liquid metal being introduced in the bottom of one of the two annular spaces and the other annular space receiving liquid metal discharging from the top of said one annular space, wherein the level of liquid metal is free within both annular spaces and wherein said first cylindrical shell which forms a separation between the two annular spaces has a top edge located above the maximum level of the liquid metal within said other annular space, the edge having a profile such that the flow of liquid metal over said edge takes place by maintaining the overflowing sheet of said liquid metal in contact along the wall of said first cylindrical shell, means for maintaining the free level of the liquid in said one of the two annular spaces above the free top edge of the first shell, and means for maintaining the free level of the liquid in said other annular space under the free top edge of the first shell, wherein the shape of said edge in vertical cross-section is that of a portion of circle joined tangentially to that wall of the first cylindrical shell which is directed towards said other annular space.

12. A reactor according to claim 1, wherein the shape of said edge in vertical cross-section is that of a portion of circle joined tangentially to that wall of the first cylindrical shell which is directed towards said other annular space.

13. A reactor according to claim 11, wherein said edge is provided with a plurality of vertical recesses which are uniformly spaced along the periphery of the edge.

* * * * *